(No Model.) 3 Sheets—Sheet 1.

M. CAMPBELL.
FLY FRAME.

No. 511,725. Patented Dec. 26, 1893.

Witnesses.
Saml. G. Stephens.
Myrtie E. Beale.

Inventor.
Malcolm Campbell,
By Albert M. Moore,
His Attorney.

(No Model.) 3 Sheets—Sheet 3.
M. CAMPBELL.
FLY FRAME.

No. 511,725. Patented Dec. 26, 1893.

Witnesses.
Saml. G. Stephens.
Myrtie C. Beals.

Inventor.
Malcolm Campbell,
By Albert M. Moore,
His Attorney

UNITED STATES PATENT OFFICE.

MALCOLM CAMPBELL, OF BOSTON, MASSACHUSETTS, ASSIGNOR TO THE WOONSOCKET MACHINE AND PRESS COMPANY, OF WOONSOCKET, RHODE ISLAND.

FLY-FRAME.

SPECIFICATION forming part of Letters Patent No. 511,725, dated December 26, 1893.

Application filed November 11, 1891. Serial No. 411,542. (No model.)

*To all whom it may concern:*

Be it known that I, MALCOLM CAMPBELL, a citizen of the United States, residing at Boston, in the county of Suffolk and Commonwealth of Massachusetts, have invented a certain new and useful Improvement in Fly-Frames, Speeders, &c., of which the following is a specification.

My invention relates to fly-frames, speeders and similar machines and has for its object to simplify the construction of the differential motion, so-called, and to lessen the friction of the parts by changing the direction of revolution of a part of the gearing. In such machines, as heretofore constructed, the large spur-gear which carries the bevel-gears of the differential motion and the sleeve-gear or spur-gear which drives the train of gears supported on the swinging-arms or "horse-head" so-called, are one or both of them frequently supported directly on and in contact with the main-shaft and rotate at a high speed in the opposite direction from said shaft which also runs at a high speed, causing a very great friction and (especially in starting the machine) a jerky motion of the differential gears and therefore of the speed-cones and a slipping of the cone-belt and a consequent unevenness of the yarn and wear of the machine and requiring very great attention to the lubrication of the parts. In other such machines both of said spur gears have been supported on a stationary sleeve surrounding the shaft. I arrange the gears of the differential motion (except the driver, which is splined upon the main shaft, and except, also, the last driven bevel gear of said differential motion, which is loose upon said main-shaft) upon a stationary sleeve which surrounds the shaft and I rotate said last-named bevel gear and the spur-gear which is above mentioned as usually driving the train of gears on the horse-head and which is loose on said main shaft in the same direction with said shaft and am thereby enabled to dispense with one of the intermediate gears heretofore used to connect said last-named gear with the gear on the back bobbin-shaft.

Figure 1:
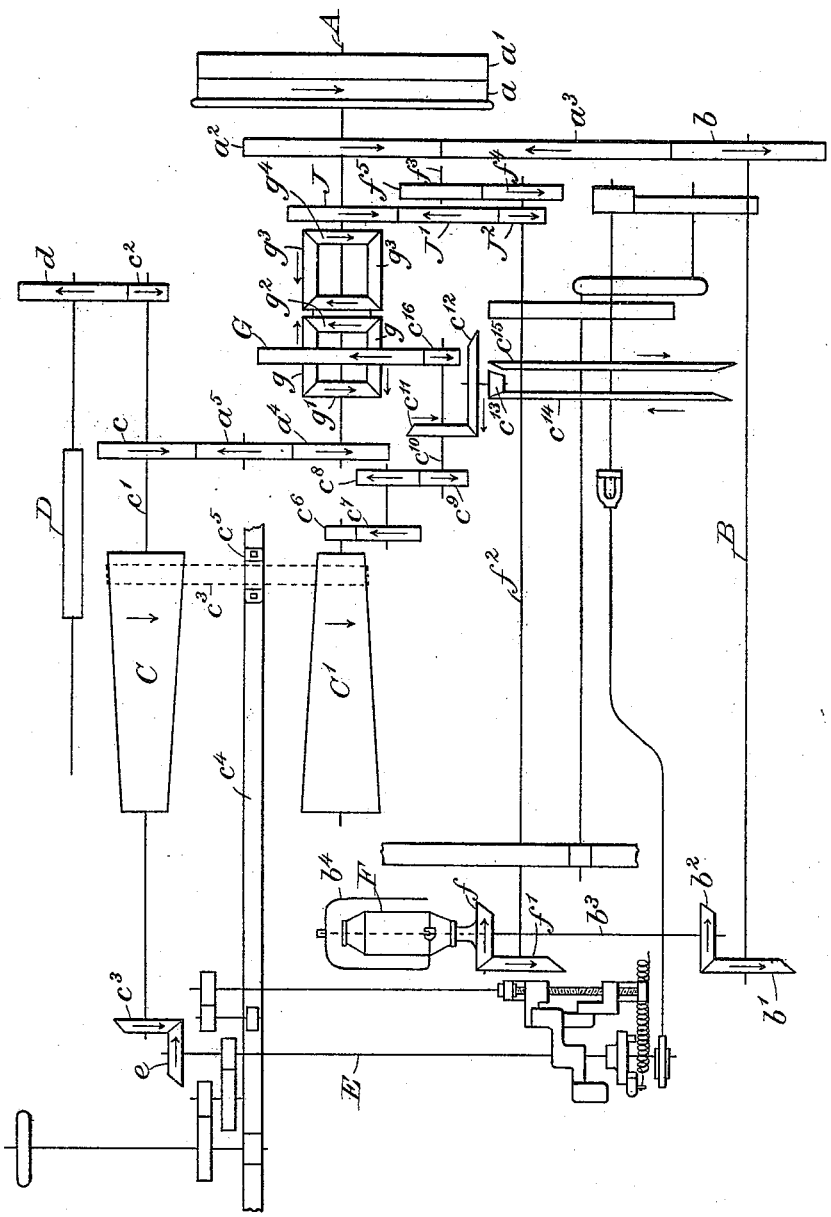
Figure 2:
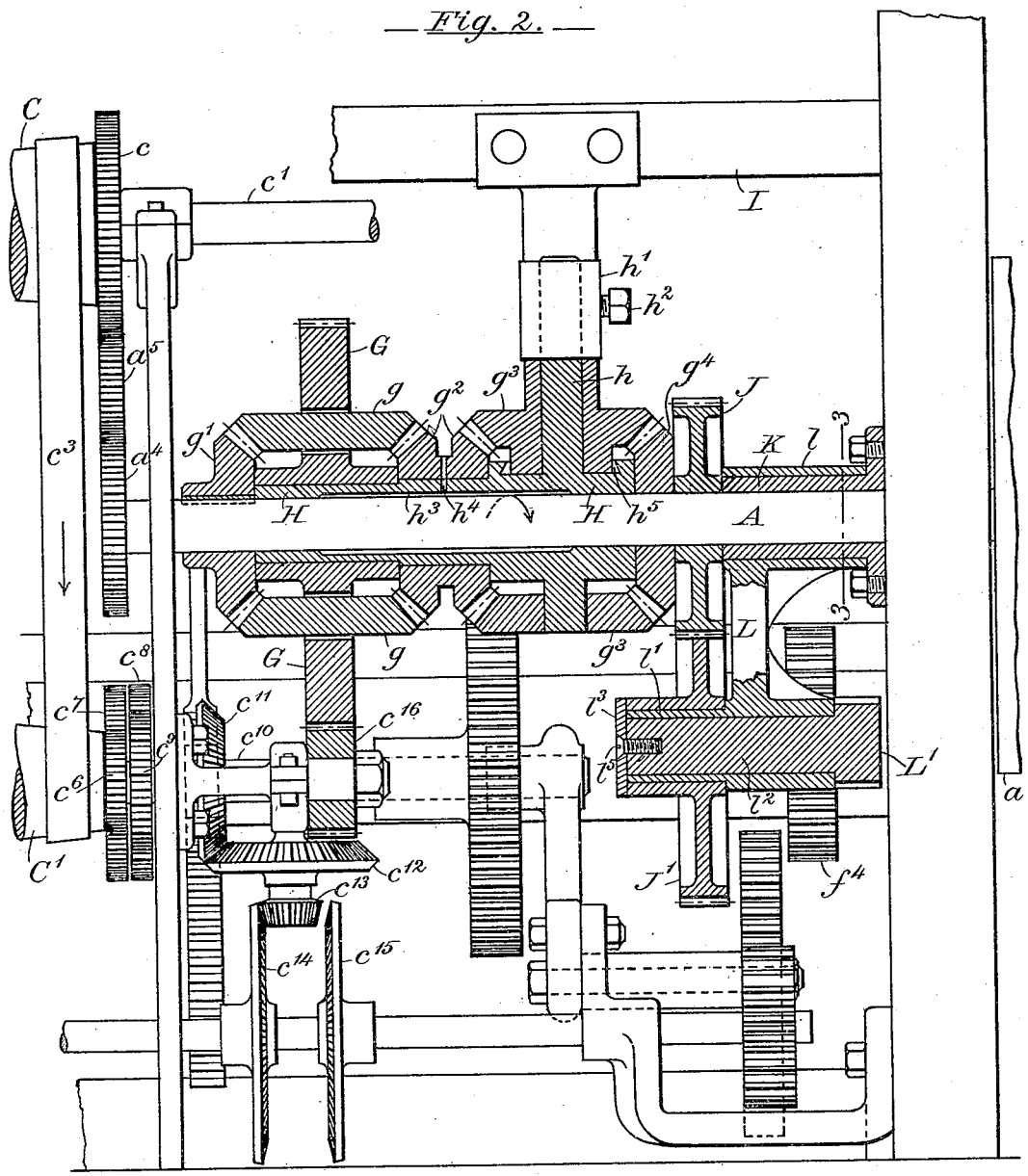
Figure 3:
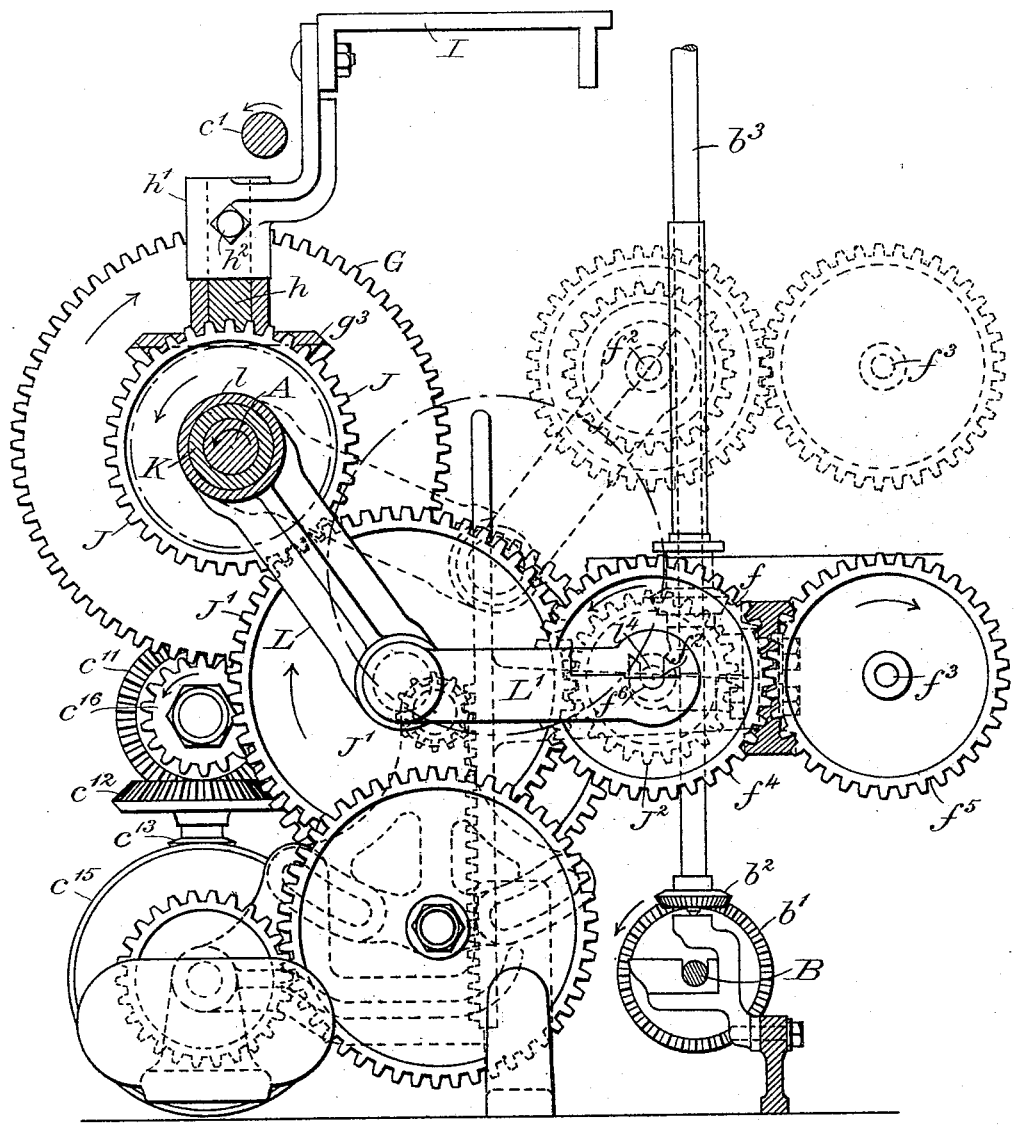

In the accompanying drawings, Figure 1 is a diagrammatic representation of so much of a fly-frame or speeder as is necessary for the understanding of my invention; Fig. 2, a front elevation of a part of the frame of a fly-frame or speeder, part of the roller-beam, parts of the cones, the cone-belt, the main-shaft, the builder-gears and shafting, and a vertical central section of the sleeves and gears which surround the main-shaft, one of the arms which connect the main-shaft and the back-bobbin-shaft, being in section at its ends, and a vertical central section of the intermediate gear, the sleeve on which it rotates, the stud which connects said arms and the cap which retains said intermediate gear on said last-named sleeve; Fig. 3, a vertical section of the frame, main-shaft, bearing sleeve of the differential gears, the bolster-rail and back spindle-shaft, a section on the line 3 3 (Fig. 2) of the sleeve-bearing or stand which supports the upper arm of the horse-head and an end elevation of the builder-gearing and spindle and bobbin-driving gearing, the end of the frame being removed.

A, is the main-shaft, carrying fast and loose pulleys $a$ $a'$ and a gear $a^2$, the latter driving the back spindle-shaft B, through the intermediate gear $a^3$ and the gear $b$ fast on said spindle-shaft. (See Fig. 1,—the three gears last-named being concealed by the frame A' in the view shown in Fig. 2.) The back spindle-shaft B, through the bevel-gears $b'$ $b^2$, drives the spindle $b^3$ and flier $b^4$ at a constant speed. The gear $a^4$ (fast on the main-shaft A), through the intermediate gear $a^5$ and through a gear $c$, fast on the shaft $c'$ of the upper cone C, drives said cone-shaft and cone at a uniform speed. A gear $c^2$, fast on said cone-shaft, engages a gear $d$ fast on the shaft of the bottom-roll D and drives said roll. (See Fig. 1.)

The shaft $c'$ carries a bevel-gear $c^3$, fast thereon and engaging a mutilated bevel-gear $e$, fast on the vertical builder-shaft E, giving to said builder-shaft an intermittent motion and by any well-known mechanism operating the rack-bar $c^4$ which by means of a belt-shipping fork $c^5$, carried by said rack-bar, in the usual manner, varies the position of the cone-belt $c^3$ on the cones C C'. A pinion $c^6$ on the shaft of the lower cone C', through intermediate gears $c^7$ $c^8$, drives the gear $c^9$ and shaft $c^{10}$. A bevel-gear $c^{11}$ on said shaft $c^{10}$ drives the bevel gear $c^{12}$ and also a bevel pinion $c^{13}$, concentric with and rotating with said last-named bevel-gear and engaging alternately the bevel-gears $c^{14}$ $c^{15}$ which operate the building devices in opposite directions in a well-known manner, all of the above-named parts being of the usual construction and operation.

The bobbin F is supported on and rotates with a bevel-gear $f$ which surrounds the spindle $b^3$ loosely in the usual manner and engages another bevel-gear $f'$ on the back bobbin shaft $f^2$. The back bobbin-shaft $f^2$ is provided with a spur-gear $f^4$ which engages a spur-gear $f^5$ fast on the front bobbin-shaft $f^3$, in the usual manner, so that both bobbin-shafts are rotated together in opposite directions. A spur-pinion $c^{16}$, fast on the shaft $c^{10}$, engages the large spur-gear G of the differential motion, which spur-gear G carries a bevel-gear $g$, journaled in the web of said gear G and engaging a bevel-gear $g'$ (fast on the main shaft A) and also engaging the double bevel-gear $g^2$, the same being, substantially, two bevel-gears concentric with each other and secured to each other, as by being cast in one piece. The double bevel-gear $g^2$ engages another bevel-gear $g^3$ which turns upon a stud $h$, secured in a holder or socket $h'$ by means of a set-screw $h^2$, said socket $h'$ being rigidly secured to the roller-beam I. The bevel-gear $g^3$ engages a bevel-gear $g^4$, loose on the main-shaft A and formed in one piece or otherwise secured to the spur-gear J. The spur-gear J engages an intermediate spur-gear J' which in turn engages another spur-gear J$^2$, fast on the back-bobbin-shaft $f^2$, above-mentioned. Usually the gear G and the combined bevel gear $g^4$ and spur-gear J are loose on the shaft and are rotated in the opposite direction therefrom, as above-stated, but the gear G and the double bevel-gear $g^2$, which latter occupies the position with reference to the gear $g$ formerly held by the bevel-gear $g^4$, are supported on a sleeve H, formed in one piece or otherwise secured to the stud $h$ and prevented by said stud from rotating on the main shaft by which said sleeve is supported and said combined bevel and spur-gear rotate in the same direction with said main-shaft, the direction of rotation of said combined bevel and spur-gear being reversed by the introduction of the bevel gear $g^3$.

Heretofore two intermediate gears have been used to connect the gear J with the gear J$^2$ but owing to the reversal of the motion of the gear J one of said intermediate gears is dispensed with in the present construction, the gear J' taking into both of the gears J J$^2$, as above stated. The sleeve H is provided with an internal cylindrical enlargement to form an oil-chamber $h^3$, to receive and retain oil between said sleeve and the shaft A, oil being introduced into said chamber through the oil-hole $h^4$. Said sleeve H is provided also with an annular oil-groove $h^5$ around the lower end of the hub of the gear $g^3$.

A sleeve-bearing or hollow cylindrical bearing K is bolted to the frame of the machine and surrounds the main shaft A, between said frame and the spur-gear J. On the bearing K is supported an arm L, provided with a sleeve $l$, which surrounds the bearing K and turns freely thereon. The other end of the arm L is also provided with a sleeve $l'$, parallel with the main shaft which receives a cylindrical stud $l^2$ which projects laterally from the front end of another arm L' to enable the distance between the non-adjacent ends of said arms L L' to be varied, at will. The intermediate gear J' has its bearing on the sleeve $l'$, being retained thereon by a cap $l^3$, arranged over the end of the stud $l^2$, outside of the hub of said intermediate gear and secured to said stud $l^2$ by a screw $l^5$. The rear end of the lower arm L' is provided with a circular hole $l^4$ which receives the bearing $f^6$ of the back-bobbin-shaft $f^2$, so that the intermediate gear is thereby held in engagement with the spur-gear J$^2$ which, as above-stated, is fast on said bobbin-shaft.

If required, the gears $g$ $g^3$ may be duplicated, as shown in Figs. 1 and 2, the duplicates being arranged concentrically with and parallel with each other, for the purpose of increasing the driving strength of and relieving the strain on said gears.

I claim as my invention—

1. The combination of the main-shaft, a bevel gear fast thereon, a stationary sleeve surrounding said shaft, and gears of a differential motion, supported on said sleeve and rotary thereon and another gear of said differential motion loose on said shaft and rotary thereon in the same direction therewith, as and for the purpose specified.

2. The combination of the main-shaft, the reversed cones, means of rotating one of said cones at a uniform speed from said main-shaft, the other of said cones being driven at a variable speed from said first-named cone, a spur-pinion, means of driving said spur-pinion from said driven cone, the stationary sleeve surrounding said main shaft, a spur-gear engaged by said spur-pinion and rotary on said sleeve, a bevel-gear journaled in the web of said spur-gear and having a motion about the axis of the same, another bevel-gear, fast on said main-shaft and engaging said first-named bevel-gear, two connected bevel-gears, rotary on said sleeve, one of which connected gears engages said first-named bevel-gear and the other of which engages another bevel-gear, rotary on a fixed bearing, said last-named bevel-gear, another bevel-gear, engaging said last-named bevel-gear and loose on said shaft and rotary thereon in the same direction therewith, a spur-gear, concentric with and secured to said last-named bevel-gear, another spur-gear, fast on the bobbin-shaft, said bobbin-shaft and a single spur-gear engaging both of said two spur-gears last-named, to rotate the bobbin shaft with a variable speed, as and for the purpose specified.

3. The combination of the main-shaft, the reversed cones, means of rotating one of said cones at a uniform speed from said main-shaft, the other of said cones being driven at a variable speed from said first-named cone, a spur-pinion, means of driving said spur-pinion from said driven cone, the stationary sleeve surrounding said main shaft, a spur-gear engaged by said spur-pinion and rotary on said sleeve, a bevel-gear journaled in the web of said spur-gear and having a motion about the axis of the same, another bevel-gear fast on said main-shaft and engaging said first-named bevel-gear, two connected bevel-gears rotary on said sleeve, one of which connected gears engages said first-named bevel-gear and the other of which engages another bevel-gear rotary on a fixed bearing, said last-named bevel-gear, another bevel-gear, engaging said last-named bevel-gear and loose on said shaft and rotary thereon in the same direction therewith, a spur-gear concentric with and secured to said last-named bevel-gear, an arm, adapted and arranged to swing about the center of said main-shaft, another arm, pivoted near one of its ends to said first-named arm and near its other end provided with a bearing to receive a bobbin-shaft, said bobbin-shaft, a spur-gear fast on said bobbin-shaft, and a single intermediate spur-gear, turning on the pivot of said arm and engaging both of said last-named spur-gears, to rotate the bobbin-shaft with a variable speed, as and for the purpose specified.

4. The combination of the main-shaft, the reversed cones, means of rotating one of said cones at a uniform speed from said main-shaft, the other of said cones being driven at a variable speed from said first-named cone, a spur-pinion, means of driving said spur-pinion from said driven cone, the stationary-sleeve surrounding said main shaft, a spur-gear engaged by said spur-pinion and rotary on said sleeve, a bevel-gear journaled in the web of said spur-gear and having a motion about the axis of the same, another bevel-gear fast on said main-shaft and engaging said first-named bevel-gear, two connected bevel-gears rotary on said sleeve, one of which connected gears engages said first-named bevel-gear and the other of which engages another bevel-gear, rotary on a fixed bearing, said last-named bevel-gear, another bevel-gear, engaging said last-named bevel-gear and loose on said shaft and rotary thereon in the same direction therewith, a spur-gear concentric with and secured to said last-named bevel-gear, a stationary sleeve concentric with said main-shaft and surrounding the same, an arm adapted and arranged to swing on said sleeve, another arm, pivoted near one of its ends to said first-named arm and near its other end provided with a bearing to receive a bobbin-shaft, said bobbin-shaft, a spur-gear, fast on said bobbin-shaft, and a single intermediate spur-gear, turning on the pivot of said arm and engaging both of said last-named spur-gears, to rotate the bobbin-shaft with a variable speed, as and for the purpose specified.

In witness whereof I have signed this specification, in the presence of two attesting witnesses, this 11th day of September, A. D. 1891.

MALCOLM CAMPBELL.

Witnesses:
ALBERT M. MOORE,
MYRTIE C. BEALS.